Patented Feb. 17, 1948

2,436,238

UNITED STATES PATENT OFFICE 2,436,238

INTERPOLYMERIZATION OF OLEFINS

Edward F. Wadley and Joseph T. Horeczy, Baytown, Tex., assignors to Standard Oil Development Company, a corporation of Delaware No Drawing. Application November 4, 1944, Serial No. 562,022

11 Claims. (Cl. 260—683.15)

The present invention is directed to a process for the interpolymerization of olefins of different molecular weight.

Hitherto, polymerization and copolymerization of olefins has been carried out with commercial success primarily with $C_4$ olefins. Many attempts have been made to utilize the lighter olefins for the production of liquid hydrocarbons by polymerization or by interpolymerization thereof with heavier olefins. When it was attempted to effect such interpolymerization, as for example of propylene with pentylene, in the presence of sulfuric acid as a catalyst, the yield and/or the quality of the polymer produced proved unsatisfactory. Attempts have been made to polymerize the lower olefins by the catalytic action of boron fluoride. These have resulted in the production of high boiling liquids which are not adaptable to commercial uses without modification.

It has now been discovered that interpolymerization of olefins of different molecular weights may be achieved readily and satisfactorily when the reaction is conducted in the presence of a mixed catalyst containing boron fluoride and sulfuric acid at suitable temperatures and pressure. The particular virtue of the process of the present invention is that it makes possible the production of high yields of $C_8$ hydrocarbons from pentylenes and propylene. The conditions of operation can be so adjusted as to favor the production of $C_8$ hydrocarbons from these starting materials over the production of hydrocarbons of higher molecular weights.

The process of the present invention is applicable to the most diverse types of mixed olefinic feeds. Because of the great demand for butylenes in other refinery processes, the process of the present invention is more desirably applied to the interpolymerization of olefins with less than 4 carbon atoms with those of more carbon atoms. The process, when applied to mixtures of $C_3$ and $C_4$ olefins, however, does produce interesting $C_7$ olefins, the branchiness of which may be influenced by suitable selection of the $C_4$ olefin. Among the $C_7$ olefins, one of particular value is 2,3,3-trimethyl-1-butene, which is assuming considerable importance in the production of high octane fuels.

The mixed catalyst employed is one made up of sulfuric acid of a strength ranging from about 50% to 80% in which is disolved from about 5 to 25 weight per cent of $BF_3$. It may be mentioned that the minimum concentration of acid given is one imposed by the fact that more dilute acid is highly corrosive. When corrosion-resistant equipment is available more dilute acid may be employed. Acid of strength above 80% influences the reaction in the direction of formation of heavy polymer. An amount of $BF_3$ below 5% gives a mixture which is too weak in catalytic activity, while an amount above 25% renders the mixed catalyst over-active and unstable.

The process of the present invention is preferably conducted in the liquid phase at temperatures between about 125° and 175° F. While the lower temperature limit given is fairly rigid, because lower temperatures increase the content of heavy ends in the product undesirably, the upper limit given is one imposed by material limitations, since above this upper limit corrosion difficulties are multiplied. If non-corrosive equipment is available, temperatures up to 250° or even 300° F. can be employed, and in fact the higher the temperature the more favorably influenced is the product with respect to content of $C_8$ hydrocarbons where propylene and pentylene are employed as starting materials. Since it is desired to conduct the reaction in liquid phase, sufficient pressure will be employed for this purpose.

For best results it is preferred that the liquid hydrocarbons be considerably in volumetric excess over the mixed catalyst, but a volume ratio of hydrocarbon to catalyst as low as 0.5 to 1 is permissible. In general, this ratio will not exceed 15 to 1. As to the hydrocarbon feed itself, it may be generally stated that the lower olefin should be in molar excess of the higher. For example, when propylene and pentylene are employed, it is preferable to have the propylene in molar excess by a ratio of 3 to 1 or higher.

In carrying out the process of the present invention, the same technique is followed as is customary in polymerization, alkylation and isomerization reactions in which hydrocarbons are caused to react by being contacted with a liquid catalyst. The various expedients employed to regulate contact times in these various other processes are applicable to the present process. More specifically, the emulsion type reaction commonly employed in alkylation is admirably suited for carrying out the process of the present invention. The contact or reaction time may vary from 15 to 90 minutes. This reaction time is shorter, the higher the temperature, and in the upper end of the operative temperature range may be as low as 5 minutes.

As an example of suitable operating conditions, product character and yield characteristic of the process of the present invention, reference is had to the following table giving the pertinent data with respect to a plurality of runs. In these runs sufficient pressure was employed to maintain the reactants in the liquid phase at the operating temperature.

| Run No. | 1 | 2 | 3 | 4 |
|---|---|---|---|---|
| Composition of Catalyst: | | | | |
| Wt. per cent BF₃ | 23.8 | 23.8 | 23.8 | 12.7 |
| Wt. per cent H₂SO₄ | 68.2 | 68.2 | 68.2 | 87.3 |
| Composition of Hydrocarbon Charge: | | | | |
| Moles of C₃/C₅ | 3 | 3 | 3 | 3 |
| Reaction Temperature, °F | 170–180 | 170–174 | 170–174 | 170–174 |
| Catalyst Treat: | | | | |
| Vol. Hydrocarbon/Vol. Catalyst | 5 | 4 | 15 | 3 |
| Reaction Time, Minutes | 60 | 45 | 90 | 35 |
| Estimated Polymer Yield (C₅ free basis): | | | | |
| Wt. per cent Based on Olefins | (¹) | 71 | (¹) | 70 |
| Engler Distillation of Polymer: | | | | |
| IBP, °F | 105 | 105 | 105 | 105 |
| Per cent off at 240° F | 69 | 50 | 57 | 57 |
| Per cent off at 320° F | 100 | 94 | 100 | 85.5 |

¹ Separation of product incomplete.

The polymers from all runs were combined and submitted to a precise distillation such as the so-called Fenske distillation. The Fenske distillation indicated the polymer to be composed primarily of C₈ olefins and C₁₀ olefins (62.5 volume per cent C₈ olefins). The C₈ fraction of the polymer was hydrogenated and the octane blending value of the hydrogenated fraction obtained. This was done by blending the hydrogenated C₈ fraction with isopentane to a 7-pound R. V. P. and then blending 40% of the 7-pound blended hydrogenated polymer with 60% of 99.7 octane number reference fuel. The 1–C blending value of the hydrogenated C₈ fraction (7-pound basis) was found to be 101.

In addition to these runs, another was carried out employing 50% H₂SO₄ containing 15.6 weight per cent BF₃ as catalyst. In this run the polymer was found to contain about 65 volume per cent of C₈ and lighter hydrocarbons.

In addition to the runs previously mentioned, two other runs were carried out which show that C₈ hydrocarbons can be easily produced by employing a BF₃–sulfuric acid mixture as catalyst. In these runs 65% sulfuric acid was added. Polymerization temperatures of 150° to 175° F. were employed. The analysis of the polymer was estimated from a Fenske distillation curve and is given below:

| Component | Volume Per Cent of Polymer |
|---|---|
| C₅–C₇ | 13 |
| C₈ | 55 |
| C₉ | 8 |
| C₁₀ | 22 |

The components of the C₈ fraction estimated from Fenske boiling points, refractive indicies, and specific gravity, are given below:

| Component | Volume Per Cent of C₈ Fraction |
|---|---|
| Dimethyl Hexane | 29 |
| Trimethyl Pentanes | 71 |

The octane rating of the C₈ fraction was obtained by blending it with 25 volume per cent isopentane and then blending it in 40% concentrations in 99.7 octane number reference fuel. The ASTM aviation plus 4 cc. TEL (1–C) blending value of the C₈ fraction was found to be 103.5.

In another operation propylene was interpolymerized with isobutylene. The catalyst was composed of 85 weight per cent of 65% H₂SO₄ and 15 weight per cent of boron trifluoride. The mole ratio of propylene to isobutylene in the feed stock was 5.5 to 1 and the volume ratio of the hydrocarbon feed to the catalyst was 4 to 1. The reaction time was 30 minutes, during which the temperature rose from 120° to 160° F.

After separation of the polymer from the acid, the former was stabilized to eliminate any C₃ and C₄ hydrocarbons. In order to obtain the distillation characteristics of the stabilized polymer, a careful fractionation was conducted with the following results:

| Vol. Per Cent Stabilized Polymer Taken O. H. | I. B. P. and F. B. P. of Cut, °F. | Br. No. of Cut |
|---|---|---|
| I. B. P. to 6% | 158–174 | |
| 6 to 28% | 174–178 | 156 |
| 28 to 38% | 178–197 | |
| 38 to 50% | 197–205 | 174.5 |
| 50 to 58% | 205–208 | 173.2 |
| 58 to 64% | 208–210 | 168.8 |
| 64 to 72% | 210–218 | |
| 72 to 76% | 218–306 | |
| 76 to 92% | 306–350 | |
| 92 to 99% | 350–396 | |

The data indicate about 64 volume per cent of the stabilized polymer to be C₇ hydrocarbons.

From the foregoing it will be observed that by the process of the present invention effective interpolymerization of olefins of different molecular weights can be realized. It will be recognized that the conditions of operation are capable of extensive variation and that various combinations of olefins may be employed as feed stock. It is to be understood that the specific operations reported are for illustrative purposes only, and are not intended to confine the scope of the present invention.

The nature and objects of the present invention having been fully described, what we desire to claim as new and useful and to secure by Letters Patent is:

1. A method for interpolymerizing olefins of different molecular weights which comprises contacting these olefins in admixture with each other with a mixture of boron fluoride and sulfuric acid of a concentration between about 50% and 80%, of which mixture the boron fluoride constitutes between about 5 and about 25 weight per cent, at a temperature between about 125° F. and 300° F. for a period sufficient to effect the desired reaction.

2. A method for interpolymerizing C₃ and C₅ olefins which comprises contacting these olefins in admixture with each other with sulfuric acid of a concentration between about 50% and 80% containing from 5 to 25% by weight of boron fluoride at a temperature between about 125° F. and 300° F. for a period sufficient to effect the desired reaction.

3. A method according to claim 1 in which the olefin of lower molecular weight is used in molar excess relative to the olefin of higher molecular weight.

4. A method according to claim 2 in which the mole ratio of C₃ olefin to C₅ olefin is at least 3 to 1.

5. A method according to claim 2 in which the sulfuric acid has a strength between about 50 and 80%.

6. A method according to claim 1 in which the olefin feed is maintained in volumetric excess with relation to the catalyst.

7. A method according to claim 2 in which the olefin feed is maintained in volumetric excess with relation to the catalyst.

8. A method according to claim 1 in which the contact time is between about 15 and 90 minutes.

9. A method according to claim 2 in which the contact time is between about 15 and 90 minutes.

10. A method for interpolymerizing olefins of different molecular weights, each of which contains more than two carbon atoms, which comprises contacting these olefins in admixture with each other with a mixture of boron fluoride and sulfuric acid of a concentration between about 50% and 80%, of which mixture the boron fluoride constitutes between about 5 and 25 weight per cent, at a temperature between about 125° F. and about 300° F. for a period sufficient to effect the desired reaction.

11. A method according to claim 10 in which the olefin of lower molecular weight constitutes at least 75% of the olefin mixture.

EDWARD F. WADLEY.
JOSEPH T. HORECZY.

REFERENCES CITED

The following references are of record in the file of this patent:

UNITED STATES PATENTS

| Number | Name | Date |
|---|---|---|
| 2,174,247 | McAllister | Sept. 26, 1939 |
| 2,181,640 | Deanesly | Nov. 28, 1939 |
| 2,199,180 | Laughlin | Apr. 30, 1940 |
| 2,205,159 | Stevens | June 18, 1940 |
| 2,220,307 | Whiteley | Nov. 5, 1940 |

FOREIGN PATENTS

| Number | Country | Date |
|---|---|---|
| 453,854 | Great Britain | Sept. 16, 1936 |
| 534,492 | Great Britain | Mar. 7, 1941 |
| 40,598 | Mexico | Feb. 6, 1941 |

OTHER REFERENCES

Slanina et al., J. A. C. S., Sept. 1935, pages 1547–1549.